Patented Apr. 23, 1935

1,998,449

UNITED STATES PATENT OFFICE 1,998,449

PROCESS FOR DISSOLVING CELLULOSE AND RECLAIMING RUBBER

Richard Lloyd Davies, Denver, Colo., assignor to Pennsylvania Salt Manufacturing Company, Philadelphia, Pa., a corporation of Pennsylvania No Drawing. Application January 28, 1933, Serial No. 654,105

8 Claims. (Cl. 18—52)

This invention relates to improvements in methods for reclaiming and softening rubber and for dissolving the cellulose contained in rubber junk.

Old and worn out tire casings and inner tubes for pneumatic tires form one of the principal sources from which rubber is reclaimed and will be employed for the purpose of describing the improved process.

Tire casings invariably contain cotton fabric, either woven or in the form of latex treated cord and in addition the rubber is nearly always mixed with a chemical accelerator. One common accelerator is known to the trade as mercaptobenzothiazole.

Inner tubes are, as a general rule, free from cotton fabric, but nearly always contain an accelerator.

It is evident that in reclaiming tire casings, it becomes necessary to separate the cellulose or cotton fibre from the rubber and this is accomplished by subjecting the scrap to the action of caustic soda, in a manner presently to be described. The presence of the accelerator also has an effect on the rubber which increases the difficulty of properly softening it, and which it is one object of this invention to overcome.

In order to describe the invention and point out in what respect it differs from the present methods, one of the processes now employed will be first described.

Old tire casings are first cut into small pieces which will pass through three-quarter inch mesh screen; this will be referred to as scrap. The scrap is then put into a steam jacketed digester. The usual charge for a digester is 4500 pounds of scrap. To the charge in the digester 500 pounds of caustic soda Na(OH) is now added, together with 200 pounds asphalt; 200 pounds pine tar; 100 pounds oleum spirits and 7000 pounds of water. The digester is now sealed and steam, at about 200 pounds per square inch, is then admitted to the jacket and this pressure maintained for the period of the treatment. The digester is provided with an agitator which is operated during the period of treatment which is usually fifteen hours. The contents of the agitator is now dumped after which it is washed and dried. The cellulose, which has been dissolved by the action of the caustic soda, is removed with the liquid. The rubber is softened to some extent by the action of the oleum, pine tar and asphalt in conjunction with the caustic soda. The dried material is now refined or milled by passing it between rolls until it becomes plastic. Owing to the presence in the rubber of the accelerator, the rubber tends to remain in a stable cured state and the refining operation is long and costly and usually amounts to from two cents to three cents per pound.

I have discovered that if the scrap is subjected while in the digester to the action of nascent oxygen, the cost of the reclaiming process can be greatly reduced because these elements facilitate the removal of the cellulose, thereby making it possible to employ 350 pounds of caustic soda instead of 500 pounds per charge of 4500 pounds of scrap, and to materially decrease the amount of oil used, which results in a substantial saving. In addition to the saving effected in the cost of the caustic soda, the oxygen also depolymerizes part of the rubber forming a viscous, resinous substance that acts as a solvent for the remainder, and thus assists in softening the rubber and reduces the time required for refining. The oxygen seems also to decompose the accelerator which makes it possible to more easily devulcanize the rubber.

In accordance with my improved method, the scrap is subjected to the same treatment as before, but instead of using 500 pounds of caustic soda, the amount is reduced to 350 pounds and 20 pounds of calcium hypochlorite is added. The hypochlorite should preferably contain 70% of available chlorine. The treatment in the digester can now be shortened to ten hours. After the contents of the digester has been washed and dried, it is then milled or refined, but on account of the action produced by the oxygen, the time required for refining can be greatly decreased, thereby effecting a considerable saving which when added to the saving in the amount of chemicals makes a substantial saving per pound of material treated.

In reclaiming rubber from tubes the problem of removing the cotton or cellulose is not present and the process can therefore be varied somewhat. The tubes, after being cut into small pieces, are boiled with caustic soda in an open boiler for a period of about four hours, after which they are treated with oil and subjected to steam pressure, after which the rubber is washed and dried. Where the rubber contains the accelerator known as mercaptobenzothiazole it will not soften under this process and such scrap has heretofore been a dead loss.

I have found that by adding to the contents of the open boiler any hypochlorite the rubber stock will soften even if it contains the accelerator mercaptobenzothiazole and that it can therefore be refined with satisfactory results. By the addition of the hypochlorite, smaller amounts of caustic soda and softening oils are required with a corresponding saving. The times required for boiling, devulcanizing and refining are also each materially shortened.

The reclaimed rubber that results when the scrap is subjected to the action of oxygen is a better rubber when considered from the standpoint of tensile strength, stretch, etc., than reclaimed rubber obtained by the old method, and therefore in addition to decreasing the cost the improved method also increases the value of the product.

Instead of adding a hypochlorite to the caustic soda solution, it is possible to generate it in the digester or the boiler by introducing chlorine gas; thus, $2Na(OH) + H_2O + Cl_2 = NaOCl + NaCl + 2H_2O$. In either case the oxygen is released from its chemical bonds and while in its nascent state produces the effects described. The exact quantity of hypochlorite used can be varied greatly and is determined mostly by the consideration of cost as it has been found that the effects usually increase with the amount of hypochlorite, but it is also apparent that too great an excess will not do any good. Improved results have been obtained when as little as two pounds of hypochlorite have been added to a charge of 4500 pounds of scrap and better results when the amount has been increased to ten pounds and as high as twenty-five pounds. The addition of the hypochlorite increases the rate at which the cellulose is dissolved, as well as softens the rubber in spite of the effect of the accelerator. It therefore follows that the addition of hypochlorite to caustic soda has beneficial effects wherever cellulose is to be digested, as in the production of rayon.

The exact reason for the beneficial results obtained are not positively known, but it is believed that the oxygen while in its nascent state produces a chemical action to which the results are due.

In the above portions of this specification, attention has been called to the depolymerizing action of nascent oxygen, either freed from or combined as the radical ClO. This action is also present if latex or crude rubber is treated by subjecting it to the action of these reagents.

When a hypochlorite, as NaOCl is brought into contact with cellulose, rubber or the various materials compounded in the rubber, oxygen is separated from the hypochlorite and produces an oxydizing effect on all of the materials and a depolymerizing effect on the rubber, and similarly it may be in some cases, that the reagents produce a chlorinating as well as a depolymerizing effect.

The object of depolymerizing the rubber is to produce a viscous resinous material which will act as a rubber solvent making a product which is softer, more adhesive and which has a lower surface tension than ordinary rubber.

The effect of this treatment on the rubber varies with the degree and the first effect is to increase its toughness. When the treatment is carried farther the tackiness and plasticity are increased and when carried still farther a rubber results which is less inflammable and more impervious to petroleum products and other rubber solvents than rubber not so treated.

In the above description hypochlorite has been pointed out as being the most desirable member of the halogen group for the purpose under consideration, but hypobromites and hypoiodites are also effective and can be substituted for hypochlorites in the method described above with substantially the same results; it is therefore evident that the hypohalites are equivalents and the selection is governed primarily by cost consideration.

What I claim is:

1. The method of treating rubber to produce depolymerization which comprises subjecting the rubber to the action of caustic soda and a hypochlorite.

2. The method of reclaiming rubber which comprises subjecting the rubber scrap under treatment to the action of caustic soda and a hypochlorite.

3. The method of reclaiming rubber from scrap containing rubber and cellulose which comprises subjecting the rubber scrap under treatment to the action of caustic soda and a hypochlorite.

4. The method of reclaiming rubber from scrap containing rubber and cellulose which comprises subjecting the scrap to heat and agitation while mixed with caustic soda and a chemical which will react with the caustic soda to produce a hypohalite.

5. The method of reclaiming rubber from scrap containing rubber and cellulose which comprises subjecting the scrap to heat and agitation while mixed with caustic soda and a hypochlorite.

6. The method of treating rubber to produce depolymerization, which comprises subjecting the rubber to the action of caustic soda and a hypohalite.

7. The method of reclaiming rubber from scrap containing rubber and cellulose, which comprises subjecting the rubber scrap under treatment to the action of caustic soda and a hypohalite.

8. The method of reclaiming rubber from scrap containing rubber and cellulose, which comprises subjecting the scrap to heat and agitation while mixed with caustic soda, and passing chlorine into the mixture to react with the caustic soda to produce a hypochlorite.

RICHARD LLOYD DAVIES.